No. 688,820. Patented Dec. 17, 1901.
J. E. BANCROFT.
APPARATUS FOR COOKING CANNED FRUIT.
(Application filed Nov. 7, 1900.)
(No Model.)
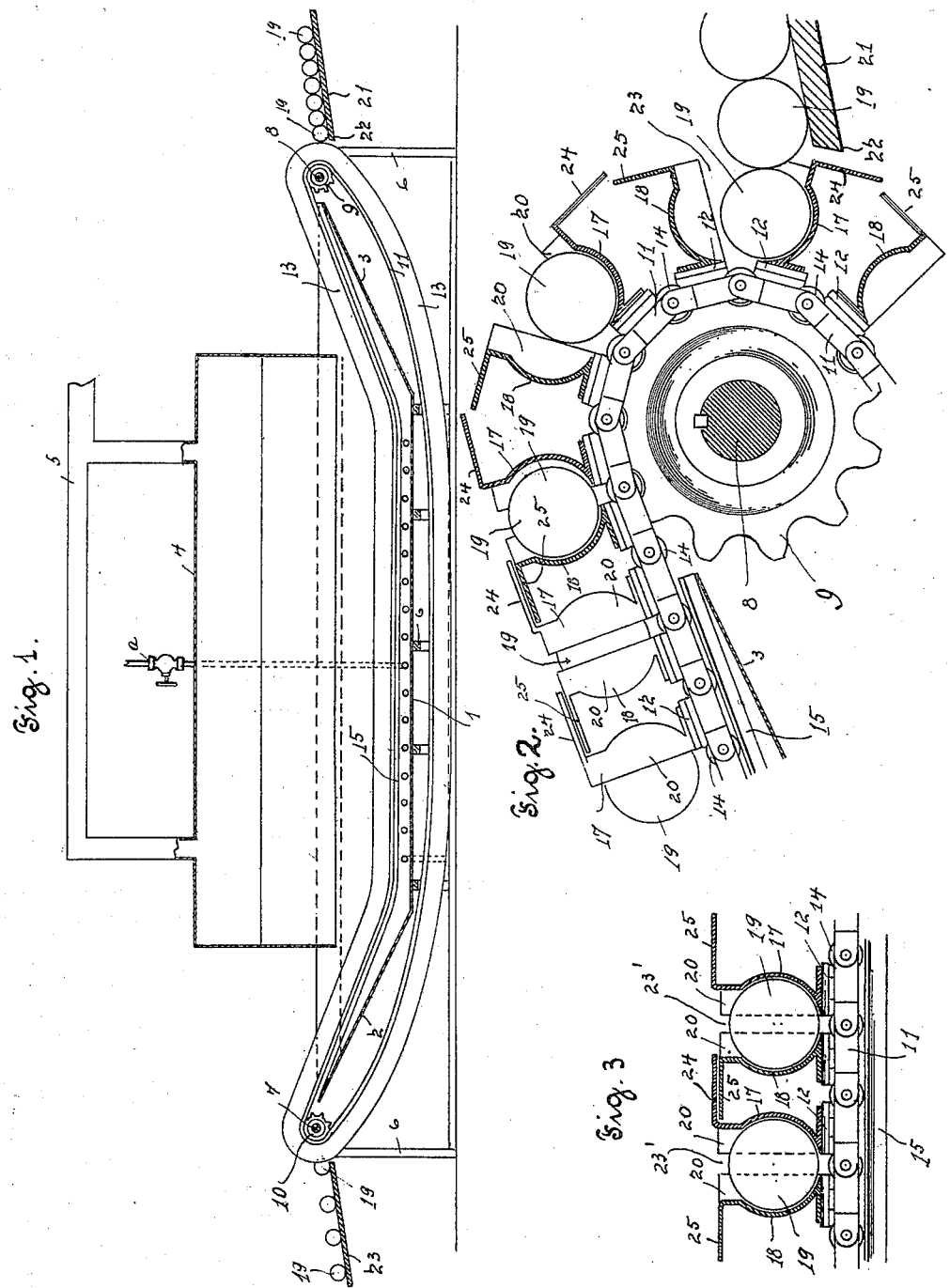
Witnesses.
Jessie Crawford.
John S. Pratt.
Inventor.
James E. Bancroft
By M. K. Perry,
Atty.
THE NORRIS PETERS CO., PHOTO-LITHO., WASHINGTON, D. C.

UNITED STATES PATENT OFFICE.

JAMES E. BANCROFT, OF TOLEDO, OHIO.

APPARATUS FOR COOKING CANNED FRUIT.

SPECIFICATION forming part of Letters Patent No. 688,820, dated December 17, 1901.

Application filed November 7, 1900. Serial No. 35,722. (No model.)

*To all whom it may concern:*

Be it known that I, JAMES E. BANCROFT, of Toledo, county of Lucas, and State of Ohio, have invented new and useful Improvements in an Apparatus for Cooking Canned Fruit; and I do hereby declare that the following is a full, clear, and exact description of the invention, which will enable others skilled in the art to which it appertains to make and use the same, reference being had to the accompanying drawings, and to the characters of reference marked thereon, which form part of this specification.

My invention relates to an apparatus for cooking canned fruit and to a scalding and cooking tank in which the fruit is properly cooked to preserve it in cans, and relates particularly to mechanical means for holding the cans in a submerged condition in the tank during the suitably-protracted transit of the filled cans through the cooking-tank.

The object of my invention is to adapt the carrier to automatically receive successive rows of cans upon its surface, clamp the cans with jaws to prevent displacement during transit, and automatically release the clamping-jaws so as to drop the cans after passing through the cooking-tank upon a suitable table, from which they may be removed for cooling.

In the drawings, Figure 1 is a longitudinal section through an apparatus constructed in accordance with my invention. Fig. 2 is an enlarged sectional detail view of the carrier construction and jaws for receiving a row of cans. Fig. 3 is a like view showing the jaws closed upon the cans during the transit of the carrier through the cooking-tank.

1 designates the cooking-tank, having its ends 2 and 3 slanting therefrom. The tank is provided with a suitable heating medium $a$ to heat the water within the tank to the necessary degree for cooking and is also provided with a hood 4 and vapor-ducts 5. The tank is supported upon a frame 6 at a desirable height, and upon the ends of the frame are suitably journaled in bearings (not shown) arbors 7 and 8. Upon each of the arbors are mounted sprocket-wheels 9 and 10, respectively, which engage the sprocket-chain 11, located upon both sides of the tank. The sprocket-chains are of a usual construction and are adapted to support slats 12, which when assembled form the carrier 13, passing through and under the tank. To obviate friction, the chains are provided with rollers 14, and the tank is fitted with a track 15 for the rollers. Upon the slats 12 of the carrier are secured jaws 17 and 18, each being curved reversely to the other to form pairs of clutching-jaws, between which the cans 19 are clamped. The curvature of the jaws is such that when the jaws are closed, as shown in Fig. 3, a pocket is formed for the cans, and the opening of the jaws above the cans being less than the diameter of the former the cans cannot float from the carrier. The jaws are also of the same width as the carrier, and upon each end of the jaws are formed lips 20 to prevent sidewise movement of the cans, and thus insure an equal immersion of the fruit-cans in the heated water, the time of immersion being from forty to forty-five minutes.

21 designates an inclined table slanting toward the sprocket-wheels 9. The slant is such as to bring the lowest point 22 of the table a little below the center of the sprocket-wheel, and, as will be seen from Fig. 2, the jaws will open to a distance sufficient to admit a can between an upper and a lower jaw by reason of the divergence of the latter in passing over the sprocket-wheels. It is evident that a like movement of the carrier in passing over the sprocket-wheel 10 will result in a like opening of the jaws, and thereby allow the cans to roll upon the outwardly-slanting table 23, which is located upon the opposite end of the tank. From this table the cans are removed manually to a point for cooling. In order to prevent the cans from lodging between the pockets 23', formed by the jaw members opening to a greater width in passing over the sprocket-wheel 9, the preceding jaw 17 is provided with rearward-turned guard 24 and the following guard 18 with a forward-turned guard 25, underlapping the preceding guard 24, and thus operating as a stop against lodgment of cans between the jaws, as is illustrated in Fig. 2. In Fig. 3 it will be seen that guard-sections 24 and 25 will overlap and underlap each other, respectively, and operate to hold a row of cans securely between the clutches which are formed in pairs by securing reversely-curved jaws to alternate slats of the carrier.

What I claim is—

1. In an apparatus for cooking canned fruit, a tank provided with heating apparatus and supported upon a frame and having slanting ends, a carrier-belt mounted upon sprocket-wheels at each end of the tank-frame and passing through and under the tank, clutching-jaws secured to the slats of the carrier-belt in pairs with reversely and outwardly curved center sections formed upon the body of the jaws, and closure-lips integral with the body portion of the jaws.

2. In an apparatus for cooking canned fruit, a tank provided with heating apparatus and supported upon a frame and having slanting ends, a carrier-belt mounted upon sprocket-wheels at each end of the tank-frame and passing through and under the tank, and clutching-jaws secured to the slats of the carrier-belt in pairs with reversely and outwardly curved center sections formed upon the body of the jaws, closure-lips integral with the body portion of the jaws, and reversely-bent plates integral with the jaws overlapping and underlapping each other and adapted to operate as guards between the pairs of jaws.

3. In an apparatus for cooking canned fruit, a tank having sloping ends, a carrier-belt passing through and under the tank, a frame for the tank, pulleys for mounting the belt which comprises a plurality of slats, clutching-jaws secured to the slats in pairs, reversely and outwardly curved center sections formed upon the body of the jaws, reversely-bent plates integral with the jaws overlapping and underlapping each other and adapted to operate as guards between the pairs of jaws, and closure-lips integral with the body portion of the jaws and tables at the ends of the belt inclined toward and from the same to deliver and receive rows of cans.

In testimony that I claim the foregoing as my own I hereto affix my signature in presence of two witnesses.

JAMES E. BANCROFT.

Witnesses:
JESSIE CRAWFORD,
WM. K. TERRY.